United States Patent

[11] 3,625,561

| [72] | Inventor | Guntram Huber<br>Sindelfingen, Germany |
|---|---|---|
| [21] | Appl. No. | 795,662 |
| [22] | Filed | Jan. 31, 1969 |
| [45] | Patented | Dec. 7, 1971 |
| [73] | Assignee | Daimler-Benz Aktiengesellschaft<br>Stuttgart-Unterturkheim, Germany |
| [32] | Priority | Feb. 1, 1968 |
| [33] | | Germany |
| [31] | | P 16 80 014.9 |

[54] REINFORCING ELEMENTS FOR A MOTOR VEHICLE BODY
21 Claims, 7 Drawing Figs.

[52] U.S. Cl. .................................................. 296/28
[51] Int. Cl. ...................................................... B62d 27/00
[50] Field of Search ............................................ 296/28;
293/52 F; 74/492, 493; 280/106, 29, 154

[56] References Cited
UNITED STATES PATENTS

| 1,915,117 | 6/1933 | Baster et al. .................. | 296/28 |
| 2,306,416 | 12/1942 | Waterhouse, Jr. ............. | 296/28 |
| 2,450,958 | 10/1948 | Hayes ............................ | 280/154 |
| 3,437,367 | 4/1969 | Blank ............................ | 280/150 B |
| 3,412,628 | 11/1968 | De Gain ........................ | 280/150 B |
| 3,487,710 | 1/1970 | Fergle ........................... | 74/492 |
| 3,211,491 | 10/1965 | Browne et al. ................. | 296/28 |

*Primary Examiner*—Benjamin Hersh
*Assistant Examiner*—Robert R. Song
*Attorney*—Craig, Antonelli and Hill ABSTRACT: Reinforcing structure for the front body portion of a motor vehicle with a front engine, especially of a passenger motor vehicle, in which reinforcing elements lead from the structural elements disposed on the side of the engine to the cross-connection arranged to the rear of the engine; the reinforcing elements are so constructed and/or arranged and/or secured that they are able to transmit pressure forces only up to a predetermined limit.

PATENTED DEC 7 1971

3,625,561

INVENTOR
GUNTRAM HUBER

BY Craig, Antonelli,
Stewart and Hill
ATTORNEYS

REINFORCING ELEMENTS FOR A MOTOR VEHICLE BODY

The present invention relates to reinforcing elements for the body front portion of a motor vehicle preferably equipped with a front engine, especially of a passenger motor vehicle, which lead from the structural elements disposed laterally adjacent to the engine to the cross-connection arranged to the rear of the engine.

In motor vehicles with a front engine, the engine space represents generally a box open toward the top and the bottom, whose sidewalls are formed by the fenders and/or so-called wheel-case sheet metal panels and whose cross-connection directed transversely to the vehicle longitudinal axis consists of the so-called dashboard or firewall which represents the separation between engine space and passenger space. For the most part, the forward cross-connection of the body is provided with a more or less large aperture, especially with a water-cooled engine whose radiator is arranged in front of the engine through which the cooling air is supposed to flow from in front thereof. Additionally, for the most part, the front axle of the motor vehicle is arranged in the body front portion. This means that all forces exerted directly or indirectly from the front axle on the vehicle superstructure, for example, impact forces or torsion forces stemming from road surface unevenness, dynamic forces of wheel imbalances, brake forces, reaction forces of the torsion stabilizers for the reduction of the tilting of the body during curve drives, have to be absorbed by the body front portion which, however, for the aforementioned reasons is open in at least two, frequently on three sides and consequently is not particularly suited therefor so that additional reinforcing measures have to be taken.

As reinforcing elements for the body front portion are known connecting struts which lead from the vehicle structural elements that laterally define or delimit the engine space, or from other frame structural elements or the like, that are disposed laterally adjacent to the engine obliquely inwardly to the rear cross-connection. Shearing deformations which are caused by torsional moments at the vehicle body front portion can be readily prevented by these diagonal struts. Additionally, the connecting structs can act as supports against vertical bending forces at the lateral structural elements, especially if the struts are inclined, not only obliquely inwardly but also obliquely upwardly.

Such types of reinforcing elements, however, entail the disadvantage that in case of accident impacts which have as a consequence a deformation of the body front portion, they transmit considerable forces to the vehicle body and also deform the same.

The present invention aims at avoiding this disadvantage and at so constructing reinforcing elements of the aforementioned type that deformations of the body front portion are not connected with or tied to deformations of vehicle body, properly speaking, i.e., of the passenger space. The present invention essentially consists in that the reinforcing elements are constructed in such a manner and/or are arranged in such a manner and/or are secured in such a manner that they are able to transmit pressure forces only up to a limited magnitude. Provision may be made advantageously that the pressure forces transmitted by the reinforcing elements are limited to such an extent that they are not able to cause any plastic deformation at the connecting places thereof of the rear cross-connection.

By such a construction of the reinforcing elements the forces occurring during normal driving operation are well absorbed, whereas with accident impacts acting essentially from front which have as a consequence deformations in the body front portion, no large forces can be transmitted to the connecting places of the reinforcing elements at the cross-connection behind the engine. As a result thereof, costly repairs as well as constrictions of the passenger space within this area can be avoided. It is possible thereby in an advantageous manner, in case of accident deformations of the body front portion, to separate or remove only the structural elements disposed in front of the dashboard and exchange or repair the same.

The reinforcing elements can consist in a conventional manner of open or hollow profiles or sections which are provided with one or more weakenings—so-called weakened places. It is achieved by these weakenings that the reinforcing elements buckle out, fold, telescope together or the like with pressure forces exceeding the permissive value.

Provision may also be made that the reinforcing elements consists of two or more parts which are connected with each other by members dimensioned and designed for the maximum pressure forces. With larger pressure forces these members, for example, are sheared off or released so that also in this case only forces up to a limited magnitude can be transmitted to the connecting places.

In a structurally simple manner, provision may be made that the reinforcing elements are secured force-lockingly in the pressure direction at the vehicle structural elements and/or at the rear cross-connection. Such a force-locking securing can be readily limited to a maximum value.

Accordingly, it is an object of the present invention to provide a reinforcing element for the body front portion for a motor vehicle which avoids by simple means the aforementioned shortcomings and drawbacks encountered in the prior art.

Another object of the present invention resides in reinforcing elements of the type described above which in effect limit the pressure forces which can be transmitted thereby to a predetermined maximum value.

A further object of the present invention resides in reinforcing elements for the front body portion of a motor vehicle which precludes deformation of the body within the area of the passenger space in case of deformation of the front portion of the vehicle caused by an accident.

Still another object of the present invention resides in a reinforcing element for a motor vehicle which is able to transmit all forces occurring within the front portion of the body during normal operations, yet is designed to preclude transmission of forces that may occur in case of accident.

These and other objects, features and advantages of the present invention will become more obvious from the following description when taken in connection with accompanying drawing which shows, for purposes of illustration only, several embodiments in accordance with the present invention, and wherein.

Figure 1:
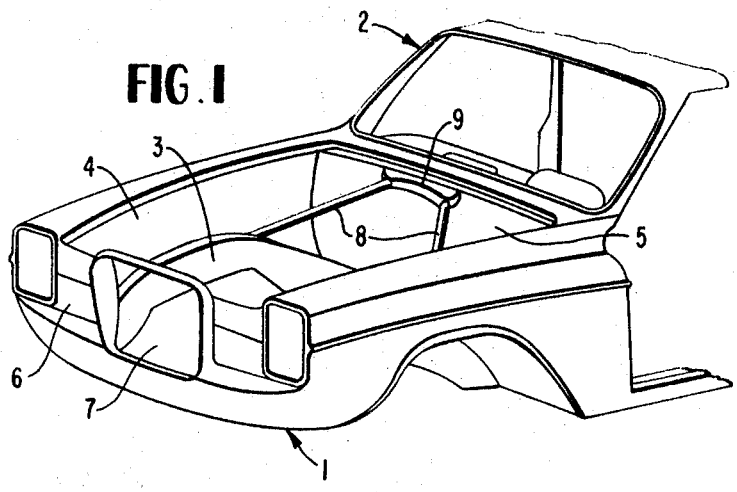
FIG. 1 is a partial perspective view of a body front portion of a passenger motor vehicle in accordance with the present invention.

Referring now to the drawing wherein like reference numerals are used throughout the various views to designate like parts, and more particularly to FIG. 1, the body front portion generally designated by reference numeral 1 of the motor vehicle generally designated by reference numeral 2 illustrated in this figure, represents a box open toward the top and toward the bottom, whose sidewalls are formed by the frame longitudinal bearers 3 and by the wheel-casing sheet metal panels 4 adjoining the same whereas the dashboard serves as rear cross-connection 5. The front cross-connection 6 is provided with an aperture 7, to the rear of which is provided the radiator (not shown) arranged in front of the vehicle engine (not shown). In order to reinforce this box open at the top and at the bottom for the absorption of the forces occurring during the normal driving operation, reinforcing elements 8 are provided which lead from the frame longitudinal bearers 3 obliquely inwardly and rising upwardly toward the cross-connection 5.

In order to prevent that the impact forces acting from in front are transmitted to the firewall 5 by the reinforcing element 8 and cause deformations, the reinforcement elements are so constructed that they are able to transmit pressure forces only up to a limited magnitude. This magnitude of the pressure forces is so selected that no deformations at the connecting places 9 of the dashboard 5 are caused by the pressure forces adapted to be transmitted. The tubular struts serving as reinforcing elements in FIG. 1, may, for example, possess the same cross section over their entire length and may be provided within certain areas with weakenings of the wall thickness which effect that the normal forces during driving operations are well absorbed whereas in case of pressure forces, starting with a predetermined magnitude, they deform, for example, by buckling out or folding.

Figure 2:
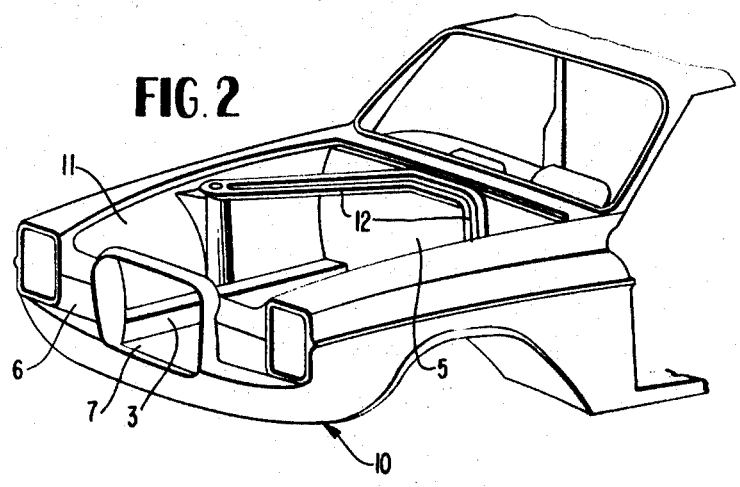
FIG. 2 is a partial perspective view of a modified embodiment of a body front portion of a passenger motor vehicle in accordance with the present invention.
Figure 6:
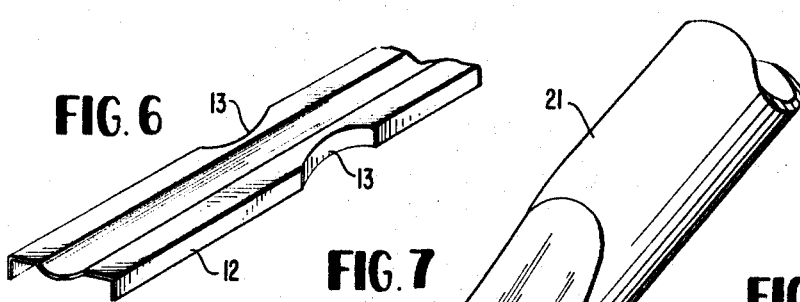
FIG. 6 is a partial perspective view of a reinforcing element in accordance with the present invention consisting of an open profile.

The body front portion generally designated by reference numeral 10 of the embodiment according to FIG. 2 also consists of a box open at the top and at the bottom. In this embodiment the wheel-casing sheet metal panels 11 are constructed for the mounting, for example, of McPherson spring legs of the front axle (not shown). For the purpose of reinforcing the box, reinforcing elements 12 are secured at the wheel-casing sheet metal panels 11 within the area of the upper pivotal connection of the spring legs whereby the reinforcing elements may consist of open profiles, for example, of sheet metal stampings or pressings. Such sheet metal stampings or pressings may, as illustrated in FIG. 6, be provided with a constriction 13 so that they are able to readily absorb the forces occurring in the normal operation but deform at pressure forces starting with a predetermined magnitude.

Figure 3:
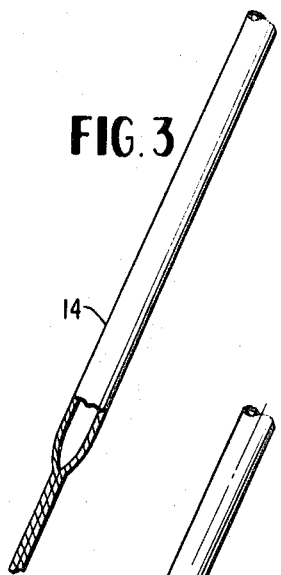
FIG. 3 is a partial elevational view, partly in cross section, of a reinforcing element in accordance with the present invention constructed as hollow profile.
Figure 4:
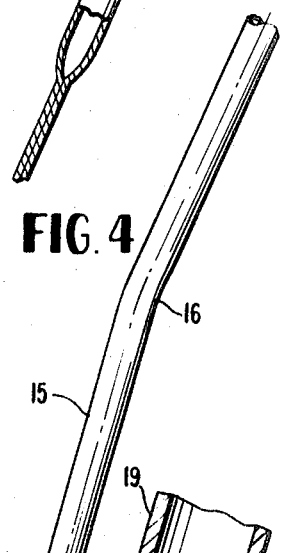
FIG. 4 is a partial elevational view, similar to FIG. 3, of a modified embodiment of a reinforcing element in accordance with the present invention.

For the purpose of achieving weakenings which become effective only with pressure forces, the reinforcing elements consisting of tubular members (FIG. 3) may be pressed flat locally. Bending or buckling places that can be predetermined are created thereby which become effective with predetermined pressure forces. In the embodiment according to FIG. 4, the reinforcing element 15 also constructed as a tubular strut is provided with a pressure force limit means in such a manner that a preexisting bending or buckling place 16 is provided which bends or buckles starting with a predetermined pressure force.

Figure 5:
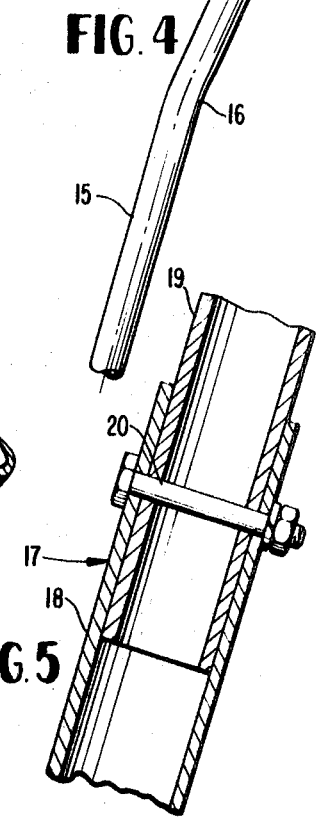
FIG. 5 is a partial axial cross-sectional view through a reinforcing element in accordance with the present invention which consists of two hollow profiles.

As illustrated in FIG. 5, the reinforcing elements may consist of two or more parts 18 and 19 which are connected with each other by members dimensioned and designed for the normally occurring maximum pressure forces. In the illustrated embodiment, a screw 20 is provided adapted to be loaded only up to a predetermined pressure force of the parts 18 and 19, which upon exceeding this pressure force, is sheared off so that the connection is released.

Figure 7:
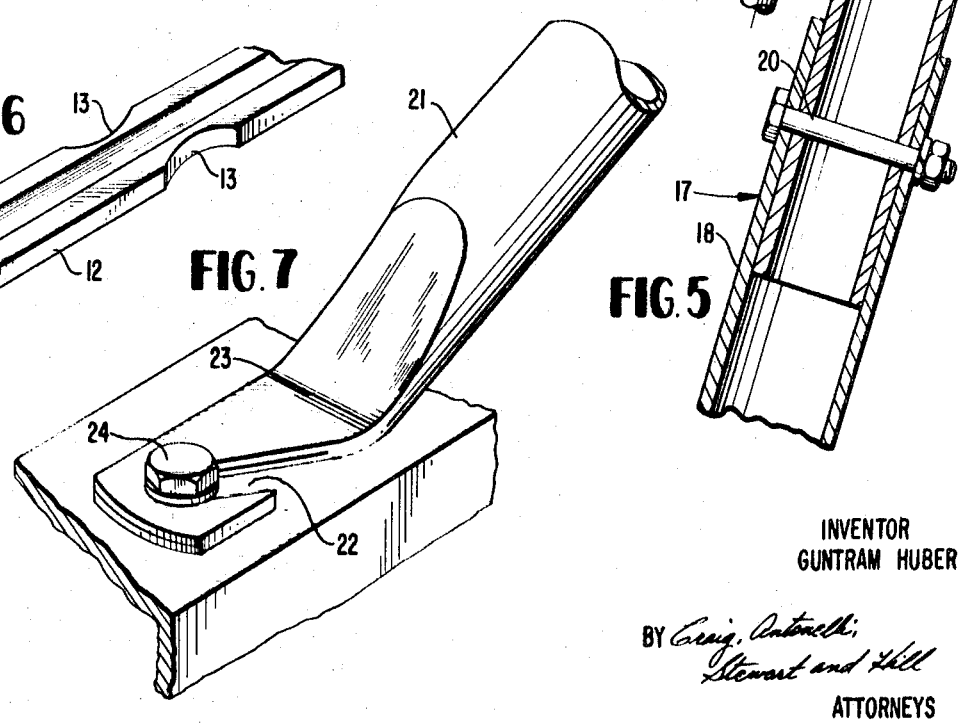
FIG. 7 is a partial perspective view illustrating a specially constructed and secured reinforcing element in accordance with the present invention.

Frequently, it may suffice to secure the reinforcing element force-lockingly at the connecting places at the frame longitudinal bearers 3 and/or at the cross wall 5; however, an additional weakening of the reinforcing elements is appropriately provided. In the embodiment according to FIG. 7, a connection of the reinforcing element 21 with the connecting place is provided which is force-locking only in the pressure direction of the reinforcing element 21. For that purpose, the tubular strut pressed flat at its end is provided with a slot 22 which permits upon exceeding a predetermined pressure force in the direction of the tubular strut that the pressed-flat part 23 can disengage itself from the bolt 24.

While I have shown and described only several embodiments in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are within the scope of those skilled in the art.

I claim:

1. Reinforcing elements for the body end portion of a motor vehicle equipped in the body front portion with a front engine, especially of a passenger motor vehicle, which lead from lateral vehicle structural elements disposed adjacent the engine to a cross-connection arranged to the rear of the engine, characterized in the the reinforcing elements are constructed as supporting means for the body front portion and transmit pressure forces only up to a limited magnitude, wherein the reinforcing elements have at least one predetermined weakened place such that, when the pressure forces of limited magnitude are exceeded, the reinforcing elements do not cause any plastic deformation at the connecting places of the rear cross-connection.

2. Reinforcing elements according to claim 1, wherein said reinforcing elements consist of profiles having at least one weakened place.

3. Reinforcing elements according to claim 2, wherein each reinforcing element is provided with several weakened places.

4. Reinforcing elements according to claim 3, wherein said profiles are opening profiles.

5. Reinforcing elements according to claim 3, wherein said profiles are hollow profiles.

6. Reinforcing elements according to claim 2 wherein said profiles are open profiles.

7. Reinforcing elements according to claim 2, wherein said profiles are hollow profiles.

8. Reinforcing elements according to claim 2, wherein a respective reinforcing element is secured force-lockingly in the pressure direction on at least one of the two parts consisting of the structural elements and the rear cross-connection.

9. Reinforcing elements according to claim 8, wherein said reinforcing elements are force-lockingly connected in the pressure direction at the structural elements and at the rear cross-connection.

10. Reinforcing elements according to claim 9, wherein said force-locking connection is formed by a slotted portion through which extends a securing means adapted to be released through the slotted portion in the presence of pressure forces exceeding the maximum value.

11. Reinforcing elements according to claim 1, wherein each reinforcing elements consists of at least two parts which are connected with each other by connecting means dimensioned for the maximum pressure forces.

12. Reinforcing elements according to claim 11, wherein said parts are mutually slideable parts, and wherein said connecting means is a member extending through said parts and designed to shear off at forces exceeding the maximum pressure forces.

13. Reinforcing elements according to claim 12, wherein a respective reinforcing element is secured force-lockingly in the pressure direction on at least one of the two parts consisting of the structural elements and the rear cross-connection.

14. Reinforcing elements according to claim 13, wherein said reinforcing elements are force-lockingly connected in the pressure direction at the structural elements and at the rear cross-connection.

15. Reinforcing elements according to claim 14, wherein said force-locking connection is formed by a slotted portion through which extends a securing means adapted to be released through the slotted portion in the presence of pressure forces exceeding the maximum value.

16. Reinforcing elements according to claim 1, wherein said reinforcing elements consists of profiles having at least one weakened place.

17. Reinforcing elements according to claim 1, wherein each reinforcing element consists of at least two parts which are connected with each other by connecting means dimensioned for the maximum pressure forces.

18. Reinforcing elements according to claim 17, wherein said parts are mutually slideable parts, and wherein said connecting means is a member extending through said parts and designed to shear off at forces exceeding the maximum pressure forces.

19. Reinforcing elements according to claim 1, wherein a respective reinforcing element is secured force-lockingly in the pressure direction on at least one of the two parts consisting of the structural elements and the rear cross-connection.

20. Reinforcing elements according to claim 19, wherein said reinforcing elements are force-lockingly connected in the pressure direction at the structural elements and at the rear cross-connection.

21. Reinforcing elements according to claim 19, wherein said force-locking connection is formed by a slotted portion through which extends a securing means adapted to be released through the slotted portion in the presence of pressure forces exceeding the maximum value.

* * * * *